United States Patent

(11) 3,592,109

| [72] | Inventor | Wade A. Eskridge<br>Overland Park, Kans. |
|---|---|---|
| [21] | Appl No | 804,500 |
| [22] | Filed | Mar. 5, 1969 |
| [45] | Patented | July 13, 1971 |
| [73] | Assignee | A. B. Chance Company<br>Centralia, Mo. |

[54] RECIPROCATING FLUID MOTOR
8 Claims, 4 Drawing Figs.

| [52] | U.S. Cl. | 91/276,<br>91/317, 91/337, 91/396 |
|---|---|---|
| [51] | Int. Cl. | F01l 17/00,<br>F01l 25/04, F15b 15/22 |
| [50] | Field of Search | 91/276,<br>317, 337, 396 |

[56] References Cited
UNITED STATES PATENTS

| 2,346,026 | 4/1944 | Henricks | 91/276 |
| 3,077,865 | 2/1963 | Hart | 91/276 |

FOREIGN PATENTS

| 2,312 | 1886 | Great Britain | 91/276 |
| 201,382 | 12/1958 | Austria | 91/276 |

Primary Examiner—Paul E. Maslousky
Attorney—Schmidt, Johnson, Hovey & Williams

ABSTRACT: A reciprocating fluid motor has a piston shiftably carried in the bore of a longitudinally extending housing. The piston includes an axial rod projecting from the housing that is adapted for attachment to mechanism requiring reciprocable drive. A freely slidable valve in the bore and shiftable by the piston alternately admits fluid pressure to opposite sides of the piston to shift the same in opposite directions. Interfitting parts on the valve and on the piston cooperate to create an imbalance of pressure on opposite sides of the piston adjacent each end of its path of reciprocation in a direction and of a magnitude sufficient to insure shifting of the valve.

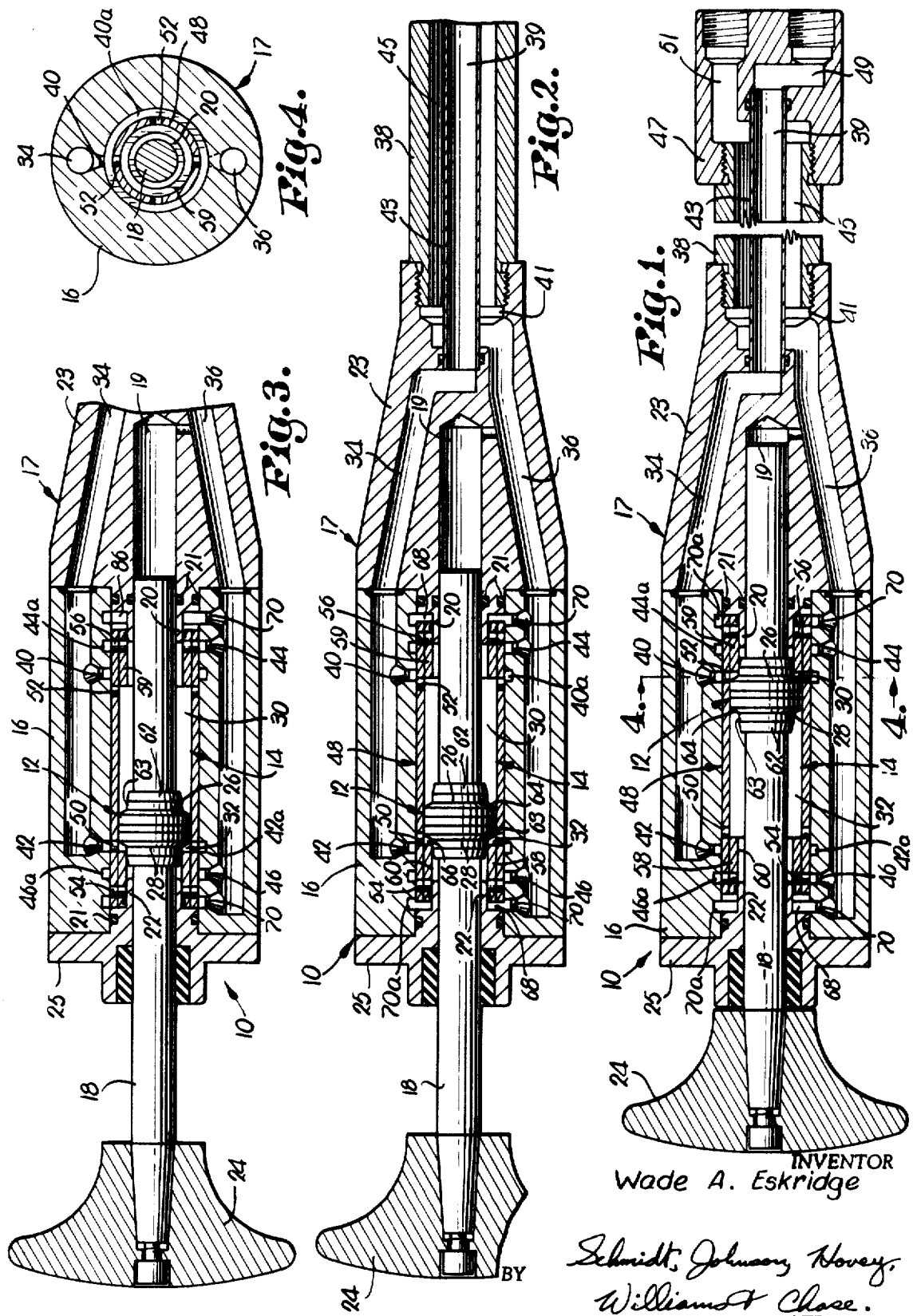

RECIPROCATING FLUID MOTOR

This invention relates to an improved, reciprocating, fluid-driven motor of the type adapted to drive units such as reciprocating mower blades, paving breakers, saws and hammers, or other devices which operate with a reciprocating motion and particularly to a motor that is useful as a drive means for an earth tamper.

Fluid motors have been widely used to drive reciprocating mechanisms because they are normally smaller, exhibit maximum power at highest load and have fewer moving parts than other types of motors of similar power output. In addition, fluid motors do not require complicated transmissions and similar power-consuming devices for operation since their speed and power output may be easily adjusted by regulating the pressure of the fluid delivered to the motor. The small size of fluid motors is especially advantageous in the construction of portable tools in the nature of earth tampers, paving breakers, and similar equipment. In equipment of this type portability is of the essence notwithstanding the need for relatively large quantities of power to be available. Manifestly, gaseous fluid may be used to drive the motor where high loads are not a problem.

Reciprocating fluid motors normally have a double-faced piston shiftably carried in a tubular housing. Valving such as a sleeve valve may be provided to alternately admit fluid pressure to opposite faces of the piston, thus causing a rod attached to the piston to be reciprocated. However, at the point in the cycle when the pressure is shifted from one side of the piston to the other, the pressure on both faces of the piston can become equal thereby causing the piston to cease movement and remain in a dead center position. Complicated springs, detents or mechanical locks have heretofore been necessary to restrain the valve from moving until pressure has built up to a level where full shifting thereof is assured or to urge the piston and associated valving structure past the dead center position and thus prevent possible locking of the piston. Such devices have generally proved unreliable, requiring frequent maintenance and increasing the original cost of the motor. The use of fluid motors having pistons that engage sleevelike valving structure to control admission of fluid pressure to the piston has also involved a problem in that the force of the piston striking the valve over a period of time tends to damage or cause wear on the valve. Furthermore, fluid pressure acting upon the ends of the valve structure retards movement of the latter, hydrostatic locking of the valve in its dead center position regardless of the nature of retainer structure associated therewith.

Therefore, an important object of this present invention is to provide a reciprocating fluid motor having a piston actuated, fluid control sleeve valve constructed in a novel manner to avoid the necessity of providing mechanical devices to urge the piston thereof past a dead center position and which also functions to maintain the valve in one control position or the other during reciprocation of the piston.

The fluid motor of this invention is of the type having a piston reciprocally mounted in the motor housing along with a movable sleeve valve surrounding the piston and shiftable by the latter as it approaches respective ends of its path of travel to cause pressurized fluid which has been directed into the housing on one side of the piston to be diverted to the opposite side thereof, and thus maintain reciprocable motion of the piston. In order to prevent hydrostatic locking of the piston, it is an important object of the invention to provide inlet and outlet ports in the sleeve valve located in spaced relationship such that the source of pressurized fluid as well as the exhaust line are both necessarily brought into momentary simultaneous communication with the motor housing on both sides of the piston when the sleeve valve is intermediate the ends of its path of movement.

It is another important object of this invention to provide a reciprocating fluid motor as described wherein the piston and respective ends of the sleeve valve are provided with parts movable into interfitting relationship when the piston approaches an opposite end of its path of movement in one of its directions of travel to present an annular fluid trapping pocket between the piston and the sleeve valve so that the increased pressure on the fluid in the pocket over that on the piston causes the sleeve valve to be shifted toward the intermediate, dual fluid communication position thereof, and which then operate to maintain a pressure imbalance on the piston as contrasted with that on the sleeve valve of a magnitude and in a direction to assure continued movement of the piston in its initial direction until the sleeve valve has been shifted to its other control location. In this manner, mechanical contrivances for urging the sleeve valve toward alternate positions thereof are completely obviated and which would otherwise be necessary to prevent possible deactivation of the motor because of stoppage of the sleeve valve in its dead center position.

A further important object of the invention is to provide a fluid motor of the characteristics referred to above wherein the fluid trapped in the annular chambers between the interfitting parts on the piston and respective ends of the sleeve valve serves as a cushion to prevent chattering of the valve during initial movement thereof, particularly when the motor is operated at relatively high rates of reciprocation.

In the drawing:

FIG. 1 is a vertical cross-sectional view of a fluid motor embodying the preferred concepts of the present invention and illustrating the piston rod and sleeve valve structure thereof in their extreme positions at one end of their paths of travel;

FIG. 2 is a fragmentary, vertical cross-sectional view similar to FIG. 1 illustrating the piston and valve assembly approaching the opposite ends of their paths of travel;

FIG. 3 is a fragmentary, vertical cross-sectional view similar to FIGS. 1 and 2 but illustrating the piston rod and valve structure in the opposite positions from those illustrated in FIG. 1; and FIG. 4 is a vertical cross-sectional view taken along line 4-4 of FIG. 1.

The fluid motor is broadly designated 10 in the drawing and includes a piston 12 shiftably positioned within bore 14 of cylindrical central section 16 of housing 17. Piston rod 18 extends outwardly from opposed faces of piston 12 and projects from opposed ends 20 and 22 of the bore 14 of section 16 in axial relationship thereto. A conical element 23 closes one end of section 16 while the opposite end thereof is provided with an annular cover plate 25 thereon. A tamper foot 24 is secured to the end of rod 18 which projects through plate 25 and is adapted to compact loose earth upon actuation by the piston. The other end of the rod 18 reciprocates in a blind, secondary bore 19 in element 23. Conventional seals 21 are provided between the parts of the housing 17 to insure that no fluid escapes from the bore 14. Piston 12 has a pair of annular faces 26 and 28 which face ends 20 and 22 respectively of the bore 14, dividing the same into a pair of chambers 30 and 32.

An elongated outer tube 38 defining a fluid passage 45 is threaded into outlet opening 41 in the outer end of element 23 and communicates with a fluid outlet passage 36 through central section 16 and element 23 of housing 17. A fluid inlet passage 34 in section 16 and element 23 leads to an inner tube 43 within tube 38 and spaced therefrom to present a cylindrical fluid passage 45 therebetween. A dual fluid passage coupling 47 is secured to the outer ends of tubes 38 and 43 and has passages 49 and 51 therethrough coupled to passages 39 and 45 respectively as shown in FIG. 1. A source of fluid pressure such as a hydraulic pump is connected to the inlet and outlet passages of coupling 47. Inlet passage 34 communicates with chambers 30 and 32 of bore 14 on opposite sides of piston 12 through inlet ports 40 and 42 and corresponding annular grooves 40a and 42a, while outlet passage 36 exhausts fluid from opposed chambers of bore 14 through ports 44 and 46 and the corresponding annular grooves 44a and 46a joined thereto.

Admission of fluid pressure into the bore 14 is controlled by an elongated cylindrical, sleeve valve 48 mounted for reciprocation between element 23 and plate 25. Piston 12 is slidable engagement with the inner surface of valve 48. Two longitudinally spaced sets of four radially disposed inlet orifices 50 and 52 are provided in valve 48 for communication with ports 40 and 42 through grooves 40a and 42a. The longitudinal spacing between the sets of orifices 50 and 52 is such that they both can communicate to a partial extent with inlet passage 34 when the sleeve valve 48 is in an intermediate position of the same as shown in FIG. 2. Similar sets of longitudinally spaced outlet orifices 54 and 56 in valve 48 cooperate with outlet ports 44 and 46 and their associated grooves 44a and 46a to exhaust fluid from the chambers 30 and 32. Each set of inlet ports 40 and 42 is spaced from adjacent sets of outlet ports 44 and 46 respectively to an extent such that fluid pressure is alternately admitted and exhausted from chambers 30 and 32 as valve 48 is shifted from one end of its path of travel to the opposite end thereof.

Valve 48 has a pair of integral, spaced-apart, inwardly directed annular shoulders 58 and 59 at opposite ends thereof which define respective cylindrical, coaxial openings 60 of a diameter to complementally receive the corresponding cylindrical portions 63 of piston 12. The outer conical sections 62 of piston 12 which merge into cylindrical portions 63 thereof thus provide corresponding lead-ins into openings 60. The larger conical surfaces 64 of piston 12 which extend between respective portions 63 and the major, cylindrical valve engaging outer surface of piston 12 cooperate with the inwardly facing annular surfaces of shoulders 58 and 59 when corresponding sections 62 are received in a respective opening 60 to form fluid-receiving pockets 66 between the conical surfaces 64 and a corresponding shoulder. In order to prevent fluid from being trapped in the cavities 68 presented between opposed ends of the sleeve valve and corresponding extremities of the bore 14 when the valve 48 is shifted from one extreme position toward another, two-spaced annular grooves 70a are provided in section 16 leading to respective ports 70 which communicate with the outlet passage 36 outboard of respective ports 44 and 46.

In describing the operation of motor 10, it is initially assumed that piston 12 and valve 48 are in the right-hand positions of the same as illustrated in FIG. 1. Orifices 50 and 52 in valve 48 are spaced longitudinally thereof a distance such that so long as valve 48 remains stationary, the corresponding set of orifices 50 or 52 will communicate an inlet port with one chamber, while orifices 54 or 56 communicate the other chamber with an outlet port. Consequently, in the positions of piston 12 and valve 48 as shown in FIG. 1, fluid from the source thereof is directed via passage 39 and 34 into port 40 and thence through ports 52 in sleeve 48 into chamber 30 to cause piston 12 to be forced toward end 22 of bore 14 while valve 48 remains stationary. Sleeve valve 48 is held against movement by the fluid pressure acting on the exposed inner face of shoulder 59. Fluid in chamber 32 escapes therefrom through ports 54 and 46 for return to the pump via passages 36 and 49.

As the conical portion 62 of piston 12 enters the cylindrical opening 60 defined by the shoulder 58 of sleeve valve 48 (see FIG. 2), fluid is partially trapped in the cavity 66 between the inner face of shoulder 58 and the proximal conical surface of portion 64 of piston 12 and the pressure in such cavity gradually increases because of the increasing diameter of the piston. An escape route for the fluid in the cavity 66 is gradually closed off until the cylindrical portion 63 of the piston enters the opening 60 to completely trap the fluid in annular cavity 66. When the pressure in cavity 66 reaches a level above that of the fluid pressure in chamber 30, an unbalanced pressure condition is created which causes the sleeve valve 48 to commence movement along with the piston toward the left as shown in FIG. 2.

The piston 12 and sleeve valve 48 continue their leftward movement until such time as the inlet passage 34 commences to communicate with chamber 32 through port 42 and the ports 50 in valve 48. At this point, port 52 is the only partial communication with inlet passage 34 through port 40. Decreasing communication of inlet passage 34 with chamber 30 through ports 40 and 52, along with increasing communication of chamber 32 with the inlet passage 34 via ports 42 eventually causes piston 12 to discontinue its movement toward the left which occurs as soon as ports 54 in valve 48 shift out of communication with the outlet port 46 leading to passage 36. Because of the intercommunication of the left-hand cavity 66 with inlet passage 34 through port 42 and ports 50 in sleeve 48, fluid is directed into the cavity 66 under a pressure to force sleeve 48 on to extreme left-hand position of the same while fluid which would otherwise be trapped in the annular left-hand cavity 68 is permitted to flow into passage 36 through the left port 70.

Upon full communication of fluid inlet passage 34 with chamber 32 through ports 42 and 50 and full communication of chamber 30 with outlet passage 36, fluid forced into chamber 32 causes the piston 12 to start moving toward the right-hand position thereof. Thus at the right-hand end of the path of travel of the piston, a sequence of operations takes place identical to those previously described to again reverse the direction of travel of the piston. So long as fluid under pressure is continuously supplied to passage 34 and allowed to escape via passage 36, the piston 12 will continue to reciprocate.

As piston 12 and valve 48 slide toward either ends of their paths of travel it can be seen that valve 48 eventually reaches a position as illustrated in FIG. 2 where each of the ports, 40, 42, 44 and 46 are partially open. In prior art devices, the valve and piston could lock at this point unless devices were provided to urge the control valve past its dead center position since equal pressure acts upon opposed annular faces 26 and 28 of the piston. However, in motor 10, such hydrostatic locking of the piston is avoided by virtue of the fact that a pressure imbalance is created when the sleeve valve reaches dead center. For example, assuming that piston 12 and sleeve valve 48 are moving to the left as shown in FIG. 2, fluid pressure in chamber 32 is permitted to act only on the left-hand conical surface 64 of piston 12 while fluid pressure in chamber 30 can act on the entire face 26 of piston 12. As a result, when both of the chambers 30 and 32 are brought into simultaneous communication with the inlet passage 34, sleeve valve 48 continues to shift to the left because the pressure in chamber 30, although equal to the pressure in chamber 32, is acting upon a greater piston area. The imbalance of forces thus created on opposite sides of the piston insures shifting of the valve 48 to prevent stopping thereof in its dead center position. Valve 48 and piston 12 will continue to move to the left until ports 40 and 46 are fully closed and ports 42 and 44 are fully opened, admitting fluid pressure only to chamber 32 and shifting piston 12 toward end 20 of bore 14.

Continuous operation of motor 10 is thereby assured without the necessity of providing springs, detents or other troublesome mechanical devices required by prior art devices to either force the piston past a dead center position or in some way or other prevent it from coming to rest in a central location. Fluid pressure trapped in the pockets 66 when valve 48 is engaged by piston 12 not only assures smooth shifting of the valve, but also cushions the piston thereagainst, assuring quiet operation with minimum wear on the component parts. Hydrostatic locking of the valve 48, due to pressure in the cavities formed between the valve and the ends of the bore, is virtually eliminated by providing appropriate exhaust ports.

Having thus described the invention, What I claim as new and desired to be secured by Letters Patent is:

1. In a fluid motor:
   a housing having a longitudinally extending bore therewithin;
   a piston shiftable in said bore having an axial rod projecting outwardly from opposed ends of the bore,
   said piston separating the bore into a pair of chambers on opposite sides of the piston;

fluid inlet and outlet passages communicating with each of said chambers;

valve means reciprocable in said bore and alternately shiftable by the piston between first and second positions, the valve means in said first position communicating the inlet passage with one chamber while communicating the other chamber with the outlet passage to cause the piston to be shifted in one direction, and said valve means in the second position thereof reversing the communication of the inlet and outlet passages with the chambers to effect shifting of the piston in the opposite direction; and parts on said valve means extending inwardly other parts extending therefrom at opposite ends of the latter and outwardly in an axial direction from opposite sides of said piston within corresponding chambers and movable into interfitting, complemental, telescopic relationship as the piston approaches respective ends of its path of travel during reciprocation thereof for initially creating an imbalance of pressure and then an imbalance of forces of sufficient magnitude on opposite sides of said piston between the latter and respective parts of the valve means to insure full reciprocation of the valve means and prevent stopping thereof in a central position.

2. The invention of claim 1, said valve means comprising a hollow cylinder slidably receiving said piston, the parts on said valve means being defined by a pair of annular, inwardly directed, spaced-apart shoulders on said cylinder, said piston including portions projecting from both ends thereof and spaced from said cylinder, said portions comprising the other of said parts, each of said shoulders defining a cylindrical opening adapted to receive a corresponding portion of the piston to thereby prevent fluid pressure in the corresponding chamber from acting upon the transverse face of an adjacent portion of the piston.

3. The invention of claim 2, said annular shoulders being located at opposite ends of said cylinder, one portion of said piston being received within one of said shoulders for effecting shifting of the valve means in one direction and the other portion of the piston being received within the other of said shoulders to effect shifting of the valve means in the opposite direction.

4. The invention of claim 2, said piston including a pair of conical surfaces disposed in outwardly projecting, circumscribing relationship with respect to a corresponding portion of said piston, said conical surfaces cooperating with a respective shoulder of the valve upon entry of a corresponding portion of the piston into an adjacent opening in the valve to form an annular pocket for trapping fluid.

5. In a fluid motor:

a housing having a longitudinally extending bore therewithin;

a piston shiftable in the bore having an axial rod projecting outwardly from opposed ends of the bore, said piston separating the bore into a pair of chambers on opposite sides of the piston;

fluid inlet and outlet passages in the housing communicating with each of the chambers;

a sleeve valve around the piston within the bore and reciprocable therein, said valve having ports therein for communicating the inlet passage with one chamber while communicating the other chamber with the outlet passage when the valve is in one position thereof, and operable to reverse the communication of the inlet and outlet passages with the chambers in a second position of the same; and annular, inwardly directed, spaced-apart shoulders on said sleeve valve on opposite sides of the piston extending into respective chambers and each defining a cylindrical opening, said piston having oppositely facing, axially projecting portions thereon of smaller diameter than said piston and each adapted to be complementally received within respective openings defined by said shoulders to form annular fluid trapping pockets between a respective shoulder and the proximal transverse surface of the piston when one of the portions enters a corresponding sleeve valve opening, said annular shoulders being spaced-apart a distance to cause said portions of the piston to enter a respective sleeve valve opening before the piston reaches the end of its path of travel in one direction, said ports in the sleeve valve being located in disposition to bring the inlet passage into communication with the annular pocket formed by entry of one of said portions of the pistons into a sleeve valve opening while the inlet passage is still maintained in communication with the chamber on the side of the piston opposite said pocket to assure full reciprocation of the sleeve valve into the other position of the same.

6. A fluid motor as set forth in claim 5, wherein said portions of piston projecting therefrom and adapted to be received in respective sleeve valve openings therefor each include an outer conical section and a generally cylindrical segment having an outer diameter approximately equal to the inner diameter of a proximal sleeve valve opening.

7. A fluid motor as set forth in claim 6, wherein transverse surfaces of the piston are of generally conical shape to cause the pressure on the fluid trapped in a respective pocket to be gradually increased during reciprocation of the piston and thereby preclude chattering of the sleeve valve.

8. A fluid motor as set forth in claim 5, wherein said housing is provided with ports therein communicating with said outlet passage at opposite ends of the bore and disposed to exhaust fluid from respective chambers ahead of the sleeve valve as it is reciprocated from one position to the other position of the same.

PO-1050
(5/69)

UNITED STATES PATENT OFFICE
CERTIFICATE OF CORRECTION

Patent No. 3,592,109     Dated July 13, 1971

Inventor(s)  ESKRIDGE, WADE A.

It is certified that error appears in the above-identified patent and that said Letters Patent are hereby corrected as shown below:

Column 5, line 12, delete "other parts extending".

Column 5, line 13, after "and" insert -- other parts extending. --

Signed and sealed this 29th day of February 1972.

(SEAL)
Attest:

EDWARD M. FLETCHER, JR.
Attesting Officer

ROBERT GOTTSCHALK
Commissioner of Patents